(12) United States Patent
Meyer

(10) Patent No.: US 6,410,867 B1
(45) Date of Patent: Jun. 25, 2002

(54) BOLTED CONICAL LOADING JOINT SYSTEM

(75) Inventor: Jeffry Meyer, Greensburg, PA (US)

(73) Assignee: ABB Inc., Raleigh, NC (US)

( * ) Notice: Subject to any disclaimer, the term of this patent is extended or adjusted under 35 U.S.C. 154(b) by 0 days.

(21) Appl. No.: 09/613,935

(22) Filed: Jul. 11, 2000

(51) Int. Cl.$^7$ .............................................. H01H 33/00
(52) U.S. Cl. ....................................... 200/49; 218/120
(58) Field of Search ............................. 200/148 B, 28, 200/48 A, 48 R–48 B, 49, 12; 218/14, 16, 17, 20, 21, 152, 153, 154

(56) References Cited

U.S. PATENT DOCUMENTS

| | | | |
|---|---|---|---|
| 1,246,023 A | 11/1917 | Kirkham | |
| 2,369,697 A | 2/1945 | Werkenthin et al. | 285/71 |
| 3,008,368 A | 11/1961 | Hammitt et al. | 85/1 |
| 3,103,887 A | 9/1963 | Nepple | 102/56 |
| 3,135,126 A | 6/1964 | Militana | 74/230.05 |
| 3,553,412 A * | 1/1971 | Kerr, Jr. | 200/48 |
| 3,662,128 A * | 5/1972 | Neudorfer et al. | 200/48 |
| 4,442,329 A * | 4/1984 | Gray et al. | 200/148 B |
| 4,563,545 A | 1/1986 | Dzomba | 174/152 R |
| 4,621,962 A | 11/1986 | Rozniecki | 411/368 |
| 5,128,502 A * | 7/1992 | Hux | 200/145 |
| 5,504,289 A | 4/1996 | Smith et al. | 200/400 |
| 5,569,891 A * | 10/1996 | Freeman et al. | 200/17 R |
| 5,584,628 A | 12/1996 | Bernoni | 411/84 |
| 5,600,112 A * | 2/1997 | Opfer | 218/154 |
| 5,629,869 A | 5/1997 | Johnson et al. | 364/551.01 |
| 5,834,725 A * | 11/1998 | Clarke et al. | 218/120 |

OTHER PUBLICATIONS

Johnson, D. et al., "The Seismic Design and Testing of ABB Dead Tank Circuit Breakers," Copyright 1992, ABB Power T&D Company Inc., pp. 1–8.

D. Johnson et al., "New Technology in SF$_6$ Breakers," ABB Power T&D Company Inc., 1989.

Freeman, Willie B., et al., "Applications of New Insulator Technologies on Circuit Breaker Bushings: an OEM's Perspective," *Insulator 2000*, Nov. 1999, pp. 1–8.

Freeman, Willie B. et al., "Development of High Interrupting Current and EHV Circuit Breakers," 1999 ABB Electric Utility Conference, Mar. 22–30, 1999, pp. 1–10.

D.S. Johnson et al., "Development of the Type 145 PM Self–Blast Circuit Breaker," 1991 Doble Client Conference, Boston, Apr. 9, 1991, Asea Brown Boveri, pp. 1–10.

Descriptive Bulletin 33–220A, "Type PM Dead Tank: SF6 Power Circuit Breakers 362 Through 550 kV," ABB Power T&D Company Inc., Apr. 1991.

Descriptive Bulletin 32–110A, "Vertical–Break Group–Operated Outdoor Disconnect Switches," ABB Power T&D Company Inc., Jul. 1991, pp. 1–12.

Descriptive Bulletin 33–200A, Type PM SF$_6$ Power Circuit Breaker, ABB Power T&D Company Inc, Nov. 1991.

Descriptive Bulletin, 33–400A, "Type ELF Live Tank: SF$_6$ Power Circuit Breakers 242 Through 800kV," ABB Power T&D Company Inc., May 1992.

(List continued on next page.)

Primary Examiner—Renee Luebke
Assistant Examiner—Nhung Nguyen
(74) Attorney, Agent, or Firm—Woodcock Washburn LLP

(57) ABSTRACT

A switching device has an improved fastening arrangement to provide a hermetic and gas-tight, secure joint where the electrical insulating bushing mates with a circuit interrupter tank. The fastening arrangement utilizes a plurality of fasteners that are inserted laterally, or more preferably, substantially perpendicular to the central axis of the insulating bushing, and spaced equidistantly around the perimeter of the insulating bushing. The switching device also discloses a novel external housing arrangement to enclose externally mounted circuit transformers that has an enhanced profile and affords easy accessibility to the transformers in the field.

14 Claims, 6 Drawing Sheets

OTHER PUBLICATIONS

Descriptive Bulletin, 33–230–A, "Type PMR & PMRI Circuit Breaker," ABB Power T&D Company Inc., Jun. 1995.
Descriptive Bulletin 33–210–A, "Type PM Circuit Breaker," ABB Power T&D Company Inc, Mar. 1997.
Descriptive Bulletin, 33–231A, "Type PMG & PME Circuit Breaker 242kV through 362 kV," ABB Power T&D Company Inc., 8/98.

Descriptive Bulletin, 32–111A, "Type TTR8," ABB Power T&D Company Inc., Jan. 1999.

Descriptive Bulletin, 33–502A, "Type CSL Circuit Switcher: 145 kV & 170 kV," ABB Power T&D Company Inc., Feb. 1999.

* cited by examiner

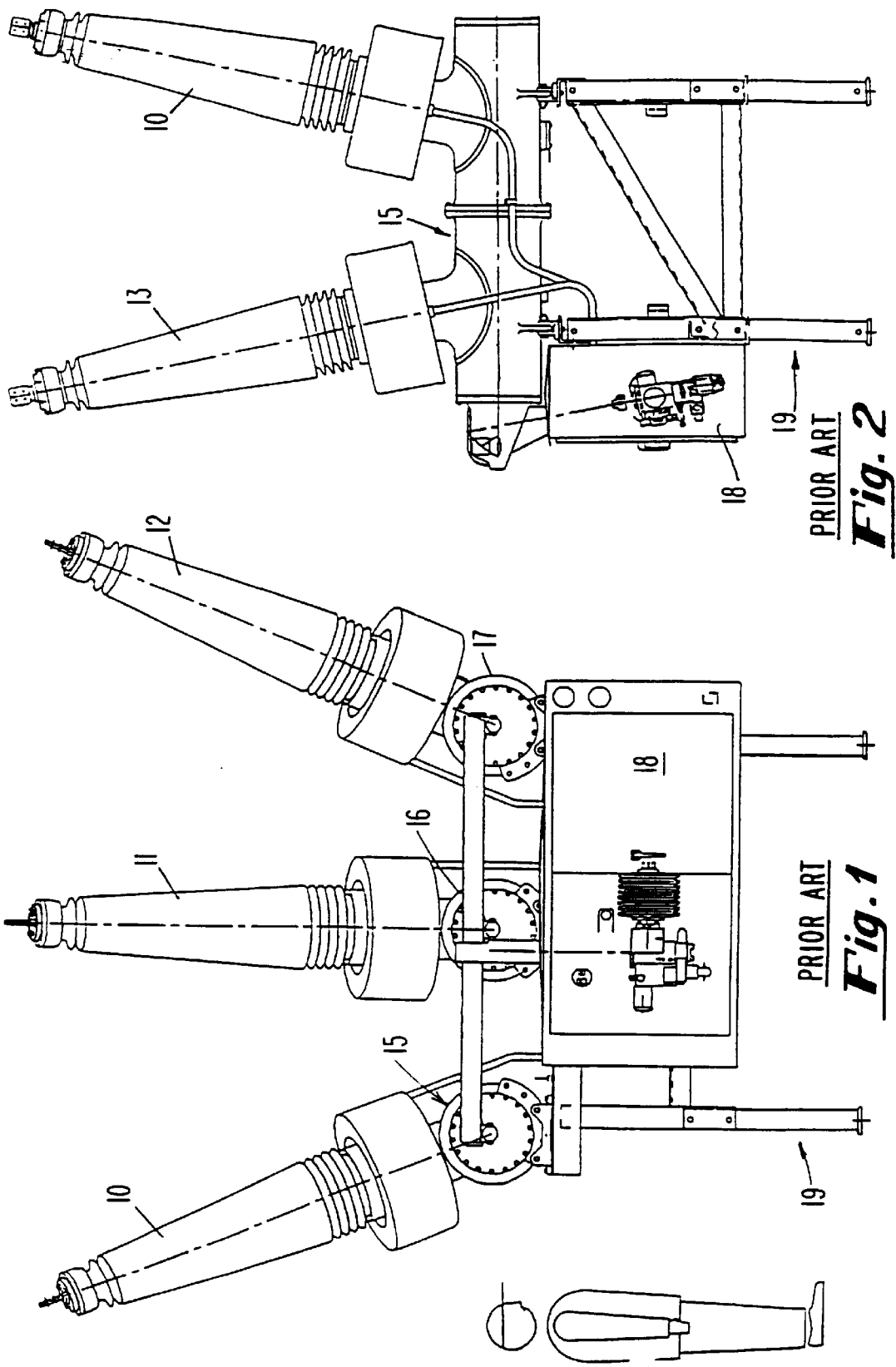

BOLTED CONICAL LOADING JOINT SYSTEM

FIELD OF THE INVENTION

The present invention relates generally to electrical switching devices. More particularly, the present invention relates to electrical switching devices with an improved joint system joining an insulating bushing to a circuit interrupter tank.

BACKGROUND OF THE INVENTION

A high voltage circuit breaker is a device used in the transmission and distribution of three phase electrical energy. When a sensor or protective relay detects a fault or other system disturbance on the protected circuit, the circuit breaker operates to physically separate current-carrying contacts in each of the three phases by opening the circuit to prevent the continued flow of current. In addition to its primary function of fault current interruption, a circuit breaker is capable of load current switching. A circuit switcher and load break switch are other types of switching device. As used herein, the expression "switching device" encompasses circuit breakers, circuit switches, dead tank breakers, live tank breakers, load break switches, reclosers, and any other type of electrical switch.

The major components of a circuit breaker or recloser include the interrupters, which function to open and close one or more sets of current carrying contacts housed therein; the operating mechanism, which provides the energy necessary to open or close the contacts; the arcing control mechanism and interrupting media, which interrupt current and create an open condition in the protected circuit; one or more tanks for housing the interrupters; and the bushings, which carry the high voltage electrical energy from the protected circuit into and out of the tank(s) (in a dead tank breaker). In addition, a mechanical linkage connects the interrupters and the operating mechanism.

Circuit breakers can differ in the overall configuration of these components. However, the operation of most circuit breakers is substantially the same. For example, a circuit breaker may include a single tank assembly which houses all of the interrupters. U.S. Pat. No. 4,442,329, Apr. 10, 1984, "Dead Tank Housing for High Voltage Circuit Breaker Employing Puffer Interrupters," discloses an example of the single tank configuration and is incorporated herein in its entirety by reference. Alternatively, a separate tank for each interrupter may be provided in a multiple tank configuration. An example of a prior art, multiple tank circuit breaker is depicted in FIGS. 1, 2, 3, and 4. Circuit breakers of this type can accommodate 72 kV, 145 kV, 242 kV, and 362 kV power sources.

The circuit breaker shown in FIG. 1 is commonly referred to as a "dead tank" because it is at ground potential. FIG. 1 provides a front view of a three phase or three-pole circuit breaker having three entrance insulating bushings, 10, 11, and 12, that correspond to each respective phase. The insulating bushings may be comprised of porcelain, composite, or a hardened synthetic rubber sufficient to withstand seismic stresses as well as stresses due to the opening and closing of the interrupter contacts within the device. In high voltage circuit breakers, the bushings for each phase are often mounted so that their ends have a greater spacing than their bases to avoid breakdown between the exposed conductive ends of the bushings.

The circuit breaker is comprised of three horizontal puffer interrupter assemblies enclosed in cylindrical tanks 15, 16, and 17. Current transformers assemblies and 21 (referring to FIG. 2), which comprise one of more current transformers and their exterior housing, are located underneath the insulating bushings on the exterior of the breaker to facilitate their replacement in field. Current transformers 20 and 21 measure outgoing current.

FIG. 2 provides a side view of the three-pole circuit breaker of FIG. 1 that shows the corresponding exit insulating bushing, 13, of the interrupter assembly housed in tank 15. FIG. 2 illustrates how entrance insulating bushing 10 and exit insulating bushing 13 is associated with tank 15. The entrance and exit insulating bushings for the interrupters in tanks 16 and 17 (not shown in FIG. 2) are arranged in a similar fashion. The devices, illustrated in FIGS. 1 through 3, have 3 pairs of entrance and exit bushing insulators, or a total of 6 bushing insulators.

Referring to FIG. 1 and FIG. 2, the three interrupter tank assemblies are mounted on a common support frame 19. The operating mechanism that provides the necessary operating forces for opening and closing the interrupter contacts is contained within an operating mechanism housing or cabinet 18. The operating mechanism is typically mechanically coupled to each of the interrupter assemblies through a common linkage such as a drive cam. The operating mechanisms can be, but are not limited to, compressible springs, solenoids, or pneumatic-based mechanisms.

FIG. 3 is a partial, cross-sectional view of the interrupter assembly housed within cylindrical tank 15 and shown in FIG. 1 and FIG. 2. A typical circuit interrupter is comprised of stationary and movable contact assemblies 31 and 23, respectively. Entrance insulating bushing 10 houses a central conductor 22 which supports movable contact assembly 23 within conductive tank 24. Movable contact assembly 23 is affixed to an insulating tube 25 through which a linearly operating rod 26 extends. Rod 26 operates movable contact 27 between its open and closed position in a well-known fashion.

Exit insulating bushing 13 houses a central conductor 30 which is connected to the stationary contact assembly 31 and is also supported within conductive tank 24. An insulating tube 32 extends between the stationary contact assembly 31 and the movable contact assembly 23.

The interior volume of tank 24, as well as the entrance and exit insulating bushings 10 and 13, are preferably filled with an inert, electrically insulating gas such as $SF_6$. The electrically insulating gas fulfills many purposes. The arcing contacts within both the stationary and movable contact assemblies are subject to arcing or corona discharge when they are opened or closed. Such arcing can cause the contacts to erode and disintegrate over time. Current interruption must occur at a zero current point of the current waveshape. This requires the interrupter medium to change from a good conducting medium to a good insulating or non-conducting medium to prevent current flow from continuing. Therefore, a known practice (used in a "puffer" interrupter) is to fill a cavity of the interrupter with an inert, electrically insulating gas that quenches the arc formed. During operation of the contacts in assemblies 23 and 31, a piston, which moves with the movable contact in assembly 23, compresses the gas and forces it between the separating contacts and toward the arc, thereby cooling and extinguishing it. The gas also acts as an insulator between conductive parts within housing 15 and the wall of tank 24.

FIG. 4 provides a detailed, cross sectional view of how an insulating bushing 33, similar to entrance insulating bushing 10 and exit insulating bushing 13 in FIG. 1 through FIG. 3, is associated with tank 34 in the prior art. Insulating bushing 33 is joined to tank 34 through the use of a mounting flange, 35, and a plurality of fasteners 36. Fasteners 36 are inserted parallel to the axis of mounting flange 35 (and the axis of insulating bushing 33) and spaced equidistantly around the periphery of flange 35. The diameter of mounting flange 35 must be sufficient to allow adequate space for fasteners 36. Moreover, the material selected for flange 36 must be suitable to withstand continuous exposure to the weather.

In addition for the joint being strong, it is also important that the joint between the insulating bushing 33 and tank 34 be gas tight and moisture tight. Both insulating bushing 33 and tank 34 have hollow interiors that are preferably filled with an inert, electrically insulating gas such as $SF_6$. Further, insulating bushing 33 contains a central conductor 37 that is connected to either a movable and stationary contact assembly (not shown in FIG. 4) within tank 34. Moisture within the interior volume of insulating bushing 33 can create an interior flashover that may prevent the bushing from operating at specified operating voltages. Lastly, insulating bushing 33 includes internal shielding 47 to reduce voltage stress at the lower end of the bushing.

As FIG. 4 further illustrates, current transformer 38, which is generally ring-shaped, is assembled over and proximate to the neck of the aperture of tank 34. Current transformers 38 are mounted external to insulating bushing 33 to allow for maximum accessibility. The external placement of current transformers 38 allow them to be replaced or changed during field use without removing bushing 33. Each bushing 33 on tank 34 typically accommodates up to three stacked current transformers 38, depending upon the accuracy and the ratio of the switching device. Current transformer 38 is contained within a weather cover, which comprises an inner can (consisting of a base 39, bottom plate 40, and back plate, 41), spacers 42, insulating gasket 43, and external cover 44. The weather cover is mounted onto the neck of tank 34 through the use of a L-shaped flange 45 that is fastened to a lip 46 (or additional flange depending upon the design of tank 40) through a plurality of fasteners 36.

Although the joinder method illustrated in FIG. 4 yields a strong joint, the use of flanges and support hardware thereby increases the size and component parts of the weather covers that house and protect the current transformers. This increased size also increases the local stresses that are imposed upon the tank due to the additional hardware required for assembly. The vertically positioned bolts can provide a path for water entry into the flange joint that may lead to corrosion. Lastly, because the current transformers are installed over the insulating bushing and the flange, the diameter of the current transformers may also be increased. Therefore, there is a need to securely join the insulating bushing and tank of an electrical switching device whereby the current transformers are protected from external elements, the number of assembly parts are reduced, and the diameter of the current transformer and its housing is minimized.

SUMMARY OF THE INVENTION

The present invention provides electrical switching devices that have a novel mounting arrangement for attaching one or more insulating bushings to a central tank without requiring the use of traditional mounting flanges. The mounting arrangement of the present invention reduces the diameter of the component parts, the number of parts required for assembly, and the stress imposed on the tank at the point of attachment. The mounting arrangement of the present invention also reduces the risk of environmental exposure of the current transformers by improving the design and profile of the weather covers. The improved design of the weather covers prevents the entry of water into the bushing-tank joint.

According to the invention, the electrical switching device has one or more insulating bushings that are laterally joined to a tank that contains the circuit interrupter assemblies. In preferred embodiments, the electrical switching device, such as the devices for 72 kV, 145 kV, 242 kV, and 362 kV three phase power, has three tanks which are supported on a common frame and six insulating bushings (or three pairs of entrance and exit insulating bushings). Other embodiments, such as the devices for 550 kV or 800 kV power, feature one large tank and two insulating bushings (or one pair of entrance and exit insulating bushings). The insulating bushings may be comprised of porcelain, silicone rubber composite, silicone composite or a hardened synthetic rubber sufficient to withstand seismic stresses as well as stresses due to the opening and closing of the interrupter contacts within the device. The bushings are preferably tubular shaped, or more preferably conical shaped, and comprise a hollow interior to house a central conductor. The bushing further comprises a central conductor that extends from the conductive tip of the bushing, through the bushing into the interior volume of the tank where the movable and stationary assemblies of the circuit interrupter assemblies are contained. The insulating bushings are further comprised of two ends: an open-ended base and a closed-end tip. A mounting ring is attached, or otherwise joined in some fashion, to a portion of the open-ended base of the insulating bushing.

The tank is preferably a cast aluminum or steel metal that can withstand high pressures and temperatures. The tank is comprised of an interior volume, to contain the circuit interrupter assemblies, and one or more apertures or openings. The open-ended base of each insulating bushing is placed over the aperture of the tank thereby forming a continuous volume. This continuous volume is preferably filled with an inert, electrically insulating gas such as $SF_6$. The joint may further include seals or gaskets to ensure that the joint is gas tight and moisture tight.

The insulating bushing and tank are joined laterally (i.e., at an angle that is not parallel to the axis of the insulator bushing) by a plurality of fasteners. In preferred embodiments, the fasteners are positioned substantially perpendicular to the central axis of the insulating bushing. In some embodiments, the fasteners are inserted into the exterior surface of the insulating bushing mounting ring and are attached to the tank by threaded openings within the tank neck or nozzle. In other embodiments, the fasteners are inserted into threaded openings in the insulator bushing mounting ring and engage the tank. The fasteners are positioned equidistantly with respect to each other around the perimeter, or circumference, of the base of the insulating body or tube to uniformly attach the insulating body to the tank and provide a high strength joint.

The number of fasteners is dependent upon the size of the insulating bushing or diameter of the insulating bushing at its base. For electrical switching devices of the present invention, the number of fasteners is preferably between 4 and 32, or more preferably between 8 and 18, to provide reliable performance and properly distribute the applied load.

The fasteners used to join the insulating body and tank in the present invention can be standard hardware, such as, but not limited to, retention bolt and nut combinations, screws, screw and nut combinations, screw or bolt and washer combinations, or rivets. In one embodiment of the present invention, the insulating bushing and tank are joined together with conical-shaped washers and bolt combinations. The bolts are inserted substantially perpendicular to the surface of the insulating bushing and engage threaded openings within the surface of the tank.

Other, more preferred embodiments, use a combination of customized fasteners and minor modifications to the insulating bushing and tank, proximate to the point of joinder, to achieve a strong joint. In a preferred embodiment, the fasteners are a combination of customized bolts, that have conical-shaped heads on the bolt ends, and a locking nut. The conical shaped heads are inserted through a locking nut and then through threaded holes in the lower mounting ring of the insulating bushing. The conical end of the bolt then engages a machined groove in the tank nozzle that is within close proximity to the opening of the tank.

The present invention also discloses exterior housing, or weather covers, for current transformers that are mounted external to the insulating bushings with an improved design. The exterior housing of the present invention, which is preferably comprised of a metal such as spun aluminum, completely enclose the current transformers and minimize such problems as moisture pooling and environmental exposure. One embodiment of the present invention also allows for easy accessibility to the current transformers without complete disassembly of the exterior housing.

It is to be understood that both the foregoing general description and the following detailed description are exemplary and are intended to provide further explanation of the invention as claimed. The accompanying drawings are included to provide a further understanding of the invention. In the drawings, like reference characters denote similar elements throughout several views. It is to be understood that various elements of the drawings are not intended to be drawn to scale.

A more complete understanding of the present invention, as well as further features and advantages of the invention, such as its application to other electrical or mechanical devices, will be apparent from the following Detailed Description and the accompanying drawings.

BRIEF DESCRIPTION OF THE DRAWINGS

FIG. 1 (prior art) shows a typical three-pole circuit breaker of the prior art.

FIG. 2 (prior art) provides a side view of the three-pole circuit breaker of FIG. 1.

Reference will now be made in detail to presently preferred embodiments of the invention, examples of which are illustrated in the accompanying drawings.

DETAILED DESCRIPTION OF PREFERRED EMBODIMENTS

The present invention is directed to electrical switching devices. More particularly, the present invention provides electrical switching devices that have a novel mounting arrangement for attaching one or more insulating bushings to a central tank without requiring the use of traditional mounting flanges. The mounting arrangement of the present invention reduces the diameter of the component parts, the number of parts required for assembly, and the stress imposed on the tank neck or nozzle at the point of attachment. The mounting arrangement of the present invention also reduces the risk of environmental exposure of the current transformers by improving the design and profile of their exterior housing or weather covers. Lastly, the improved design of the exterior housing prevents the entry of water into the bushing-tank joint.

Figure 3:
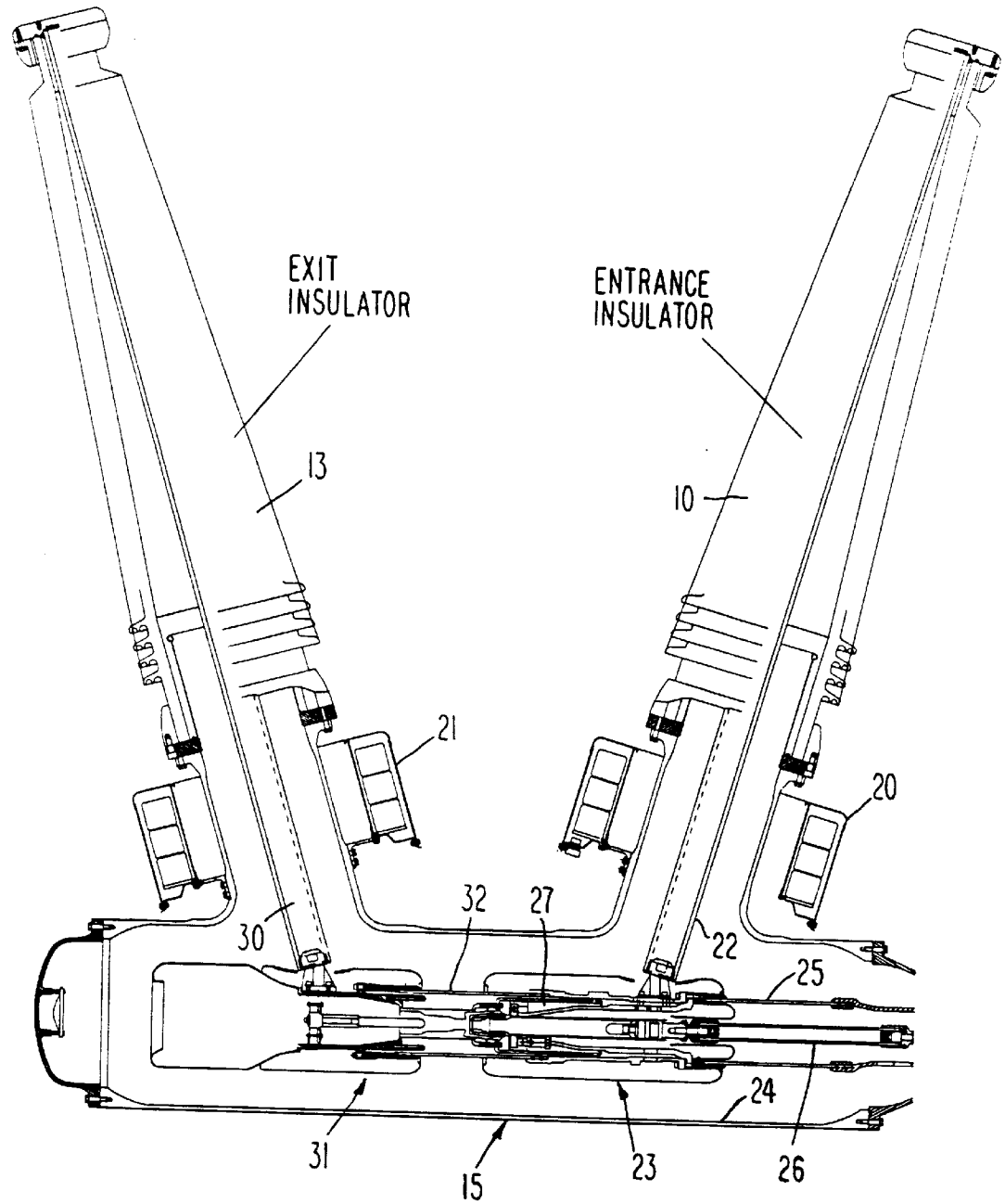
FIG. 3 (prior art) is a partial, cross-sectional view of the circuit interrupter assembly of FIG. 1 with its contacts open.
Figure 4:
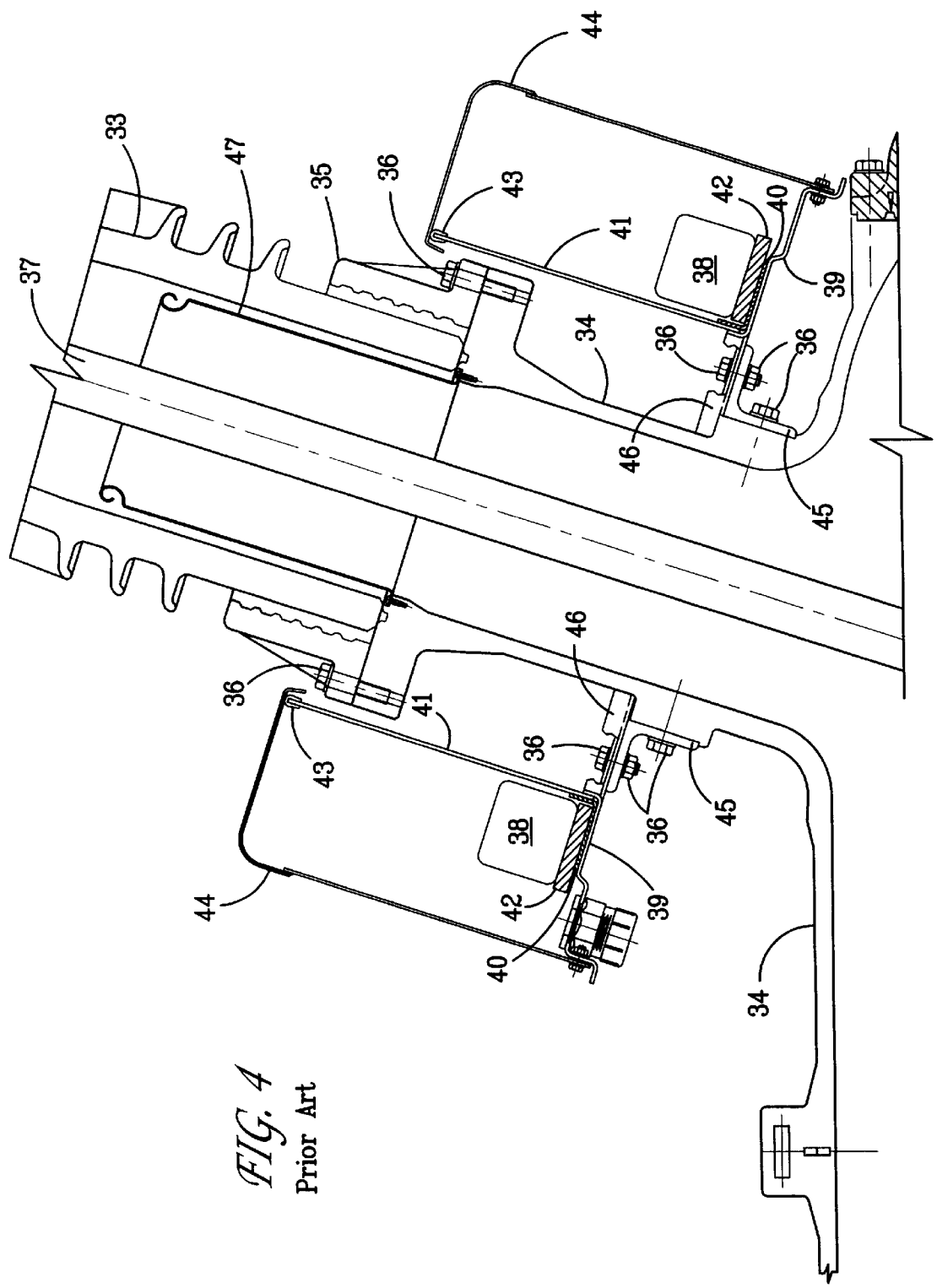
FIG. 4 (prior art) provides a detailed, cross-sectional view illustrating the arrangement of the insulating bushing, tank, and current transformers of the prior art.
Figure 5:
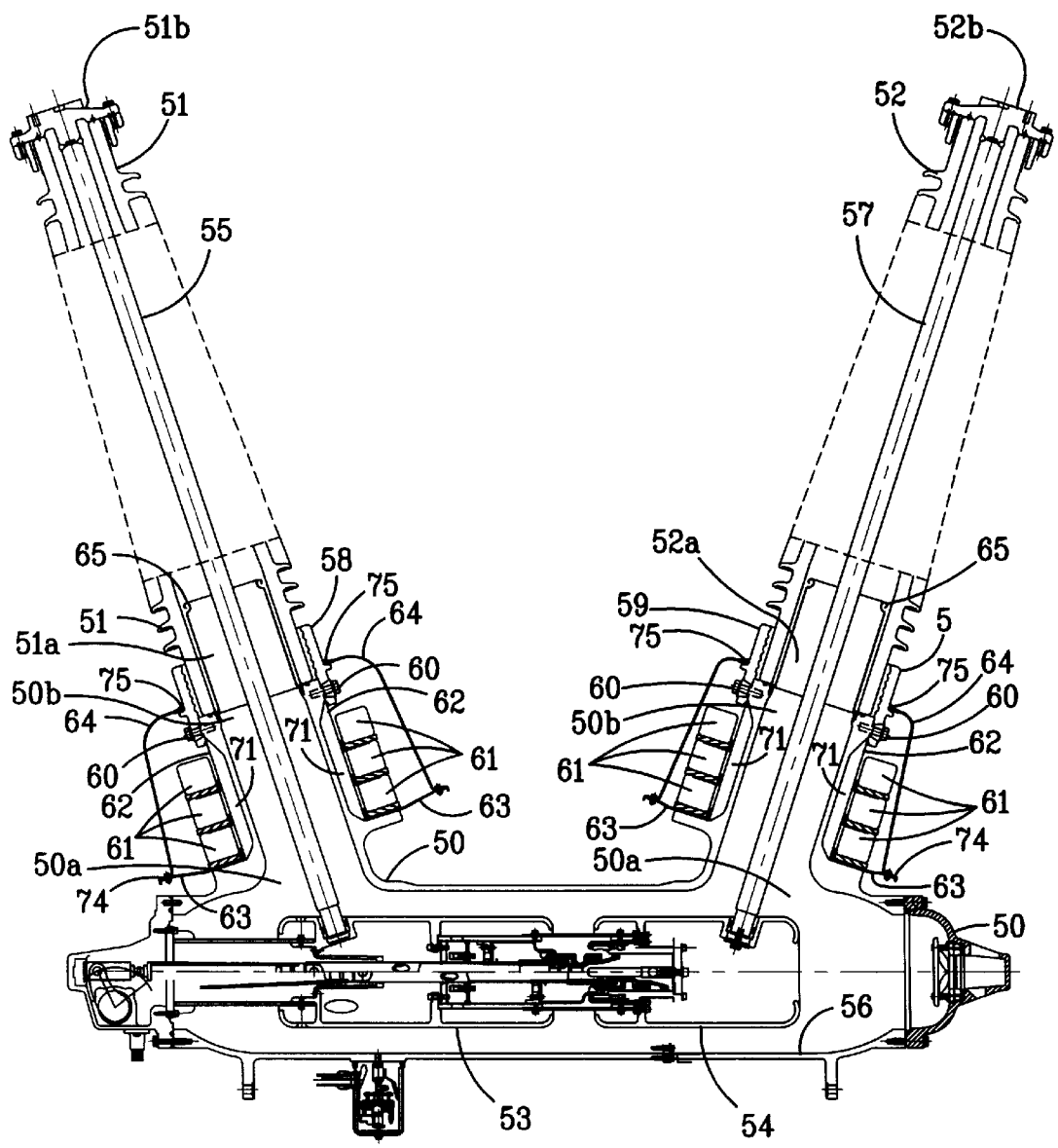
FIG. 5 provides a cross-sectional view of the circuit interrupter assembly of the present invention.

An embodiment of the fastening arrangement of the present invention is depicted in FIG. 5. FIG. 5 is a partial, cross-sectional view of the interrupter assembly housed within cylindrical tank 50 and comprises entrance insulating bushing 51 and exit insulating bushing 52. The circuit interrupter of FIG. 5 is comprised of movable and stationary contact assemblies 53 and 54, respectively. Entrance insulating bushing 51 houses a central conductor 55 (shown in a cut-away view) which supports movable contact assembly 53 within conductive tank 56. Exit insulating bushing 52 houses a central conductor 57 (shown in a cut-away view) which is connected to the stationary contact assembly 54 and is also supported within conductive tank 56. The interior volume of tank 56, as well as the entrance and exit insulating bushings 51 and 52, are preferably filled with an inert, electrically insulating gas such as $SF_6$. In preferred embodiments, the rated gas pressure of $SF_6$ is 87 psig at 68° F. (600 KPa at 20° C.), however, other gas pressures may be utilized. Voltage stress at the lower ends of the insulating bushings is effectively graded by internal shielding 65.

As shown in FIG. 5, entrance insulating bushing 51 and exit insulating bushing 52 are joined to tank 50 at their lower portion or mounting ring, 58 and 59. The mounting ring is joined to the lower portion of the insulating bushing via adhesion or other means. In other embodiments, an external mounting ring or device is used. The insulating mounting ring is preferably comprised of a material that is weather resistant and exhibits high strength and high thermal expansion, such as a metal like aluminum and/or copper. Insulating mounting rings 58 and 59 also provide a ground plane and assist in sealing the joint between the insulating bushings 51 and 52 and tank 50. Both insulating bushings are positioned directly atop openings or apertures 50a within tank 50 thereby forming a continuous volume between bushings 51 and 52 and tank 50. As shown in FIG. 5, the inner surface of insulator mounting rings 58 and 59 contact a portion of the outer surface of the mouth or nozzle 50b of the openings within tank 50. It is anticipated that other arrangements, that form a continuous volume between the insulating bushing and tank, would not depart from the spirit of the present invention. Fasteners 60 are then inserted laterally, or at an angle not parallel to the central axis of insulating bushing 51 and 52, to the surface of rings 58 and 59 and adhere insulating bushings 51 and 52 to tank 50. In preferred embodiments, fasteners 60 are inserted substantially perpendicular to the central axis of insulating bushings 51 and 52. The joint formed at the intersection of insulating mounting rings 58 and 59 and tank 50 may further include gasket materials or seals (not shown) to prevent the release of insulating gas, such as SF$_6$, or the entrance of moisture into the combined interior volume of insulating bushing 51 and 52 and tank 50.

Insulating bushings 51 and 52 can be comprised of a variety of nonmetallic, insulative materials, including but not limited to, porcelain (more preferably higher strength porcelain), silicon rubber composite, silicon rubber/fiberglass reinforced epoxy composite, silicone composite, or a hardened synthetic rubber. Insulating bushings 51 and 52 must withstand a variety of stresses, such as seismic stresses, environmental stresses and aging, stresses due to the opening and closing of the interrupter contacts within the device, the internal pressure of the insulating gas or SF$_6$, the internal electrical field in the insulating gas between the high voltage central conductor 55 and 57 and the grounded portion of tank 50, and the external electrical filed in the air along the length of the bushings. As a result of these stresses, insulating bushings 51 and 52 must be design tested to comply with applicable breaker standards such as ANSI C37, IEEE 693, NEMA SG-4. In some embodiments, such as the higher voltage 550 kV and 800 kV switching devices, bushings 51 and 52 are preferably comprised of a composite such as silicone rubber to reduce the weight of the bushing and the potential for injury due to catastrophic failure. When composite insulating bushings are damaged, the bushings leak the pressurized insulating gas slowly rather than fail catastrophically like a porcelain bushing.

The geometry of insulating bushings 51 and 52 is preferably tubular shaped, or more preferably conical shaped, and comprises a hollow interior to house the central conductors, 55 and 57. A conical or tapered geometry is preferred because the mass towards the tip of insulating bushing 51 and 52 is reduced. Insulating bushings 51 and 52, however, can have a variety of different geometries depending upon the requirements and design of the electrical switching device. The insulating bushings are further comprised of two ends: an open-ended base 51a and 52a and a closed-end tip 51b and 52b. The open-ended base, 51a and 52a, of insulating bushings 51 and 52 may further comprise a lower ring 58 and 59 that is mounted over the mouth 50b or apertures 50a of tank 50 thereby facilitating attachment of the bushings to the tank.

Tank 50 is preferably a cast aluminum or steel metal that can withstand high internal pressures and temperatures. Cast aluminum tanks are more preferred than steel to allow optimized placement of material where greater strength or reinforcement is needed. The ability to shape the material of tank 50 allows, for example, reinforcement against bushing 51 and 52 moments, while leaving the remainder of tank 50 of a thinner material thickness for weight reduction. Tank 50 is comprised of an interior volume, to contain the circuit interrupter assemblies or conductive switching portion comprised of stationary and movable assemblies 53 and 54, and one or more apertures or openings 50a. The open-ended base, more particularly 51a and 52a, of each insulating bushing 51 and 52 is placed over the mouth 50b of the aperture 50a of the tank 50 thereby forming a continuous volume. This continuous volume is preferably filled with an inert, electrically insulating gas such as SF$_6$. The joint may further include seals or gaskets to ensure that the joint is gas tight and moisture tight.

Figure 6:
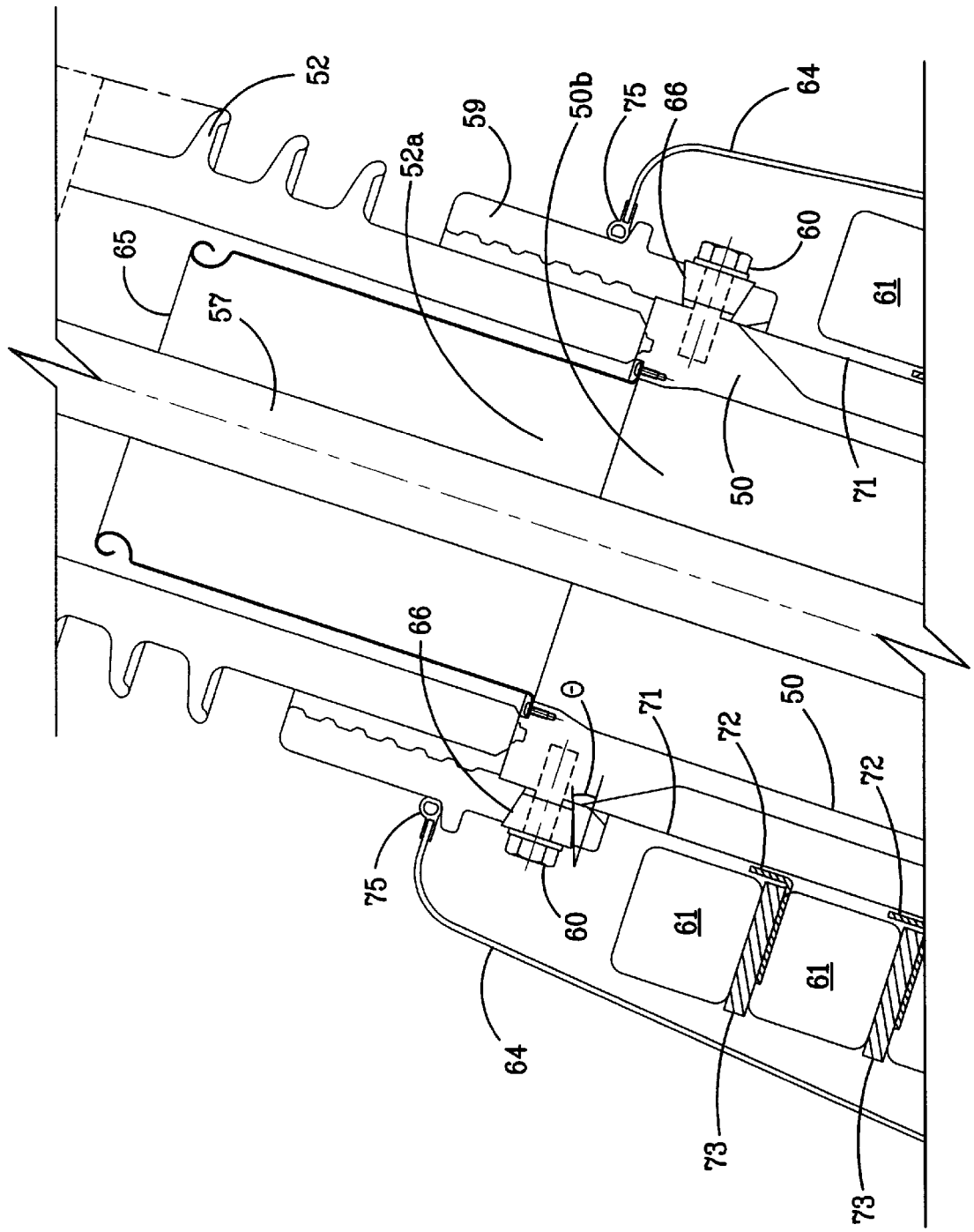
FIG. 6 provides a detailed, cross-sectional view of one embodiment of the fastening arrangement of the present invention.

FIG. 6 provides a detailed side view of an embodiment of the fastening arrangement of the present invention shown within the electrical switching device of FIG. 5. FIG. 6 shows fasteners 60 that are employed to join insulating bushing 52 and tank 50. Fasteners 60 can be standard hardware, such as, but not limited to, retention bolt and nut combinations, screws, screw and nut combinations, screw or bolt and washer combinations, or rivets. In preferred embodiments, the diameter of the fastener selected is a function of sheer strength.

In one embodiment of the present invention such as that shown in FIG. 6, the insulating bushing 52 and tank 50 are joined together with conical-shaped washers 66 and fastener 60 combinations. As illustrated in FIG. 6, the angle of tapering for the conical washer θ should be between about 7° and about 20°, or more preferably an angle of about 10° to about 15°, to join the insulating bushing and tank together. Fasteners 60 are inserted laterally, or at an angle that is not parallel to the central axis of insulating bushing 52, into a conical-shaped washer 66 that is disposed within lower ring 59 of the insulating bushing 52 and then into tank 50. In preferred embodiments, fasteners 60 are inserted substantially perpendicular to the central axis of bushing 52. In some embodiments, fasteners 60 may be inserted into an external mounting flange (not shown) that is placed over the base of insulating bushing 52. LOCTITE® adhesive (manufactured by Loctite Corporation of Rocky Hill, Conn.) is preferably added to retain fasteners 60 to minimize friction, improve clamping force, and act as a partial weather seal. Fasteners 60 are located on the base portion of insulating bushing 52, or lower ring 59, and spaced equidistantly apart (or circumferentially apart if insulating bushing 52 has a circular cross section at its base) from each other. In some embodiments, fasteners 60 are inserted through the exterior surface of the insulating bushing mounting ring and engage threaded openings within the nozzle or neck of tank 50.

The number of fasteners 60 used to secure the assembly together is dependent upon the size of the insulating bushing 52 or diameter of the insulating bushing at its base. Typical diameters for 72 kV, 145 kV, 242 kV, 362 kV, 550 kV, and 800 kV devices are 9 inches, 13 inches, 17 inches, 17 inches, 24 inches, and 26 inches, respectively. For a high strength joint, the radial distance between fasteners is preferably 5 inches or less. For electrical switching devices of the present invention, the number of fasteners is preferably between 4 and 32, or more preferably between 8 and 18, to provide reliable performance and properly distribute the applied load. A 72 kV electrical switching device may require 8 fasteners whereas a 800 kV device may require 18 fasteners.

Figure 7:
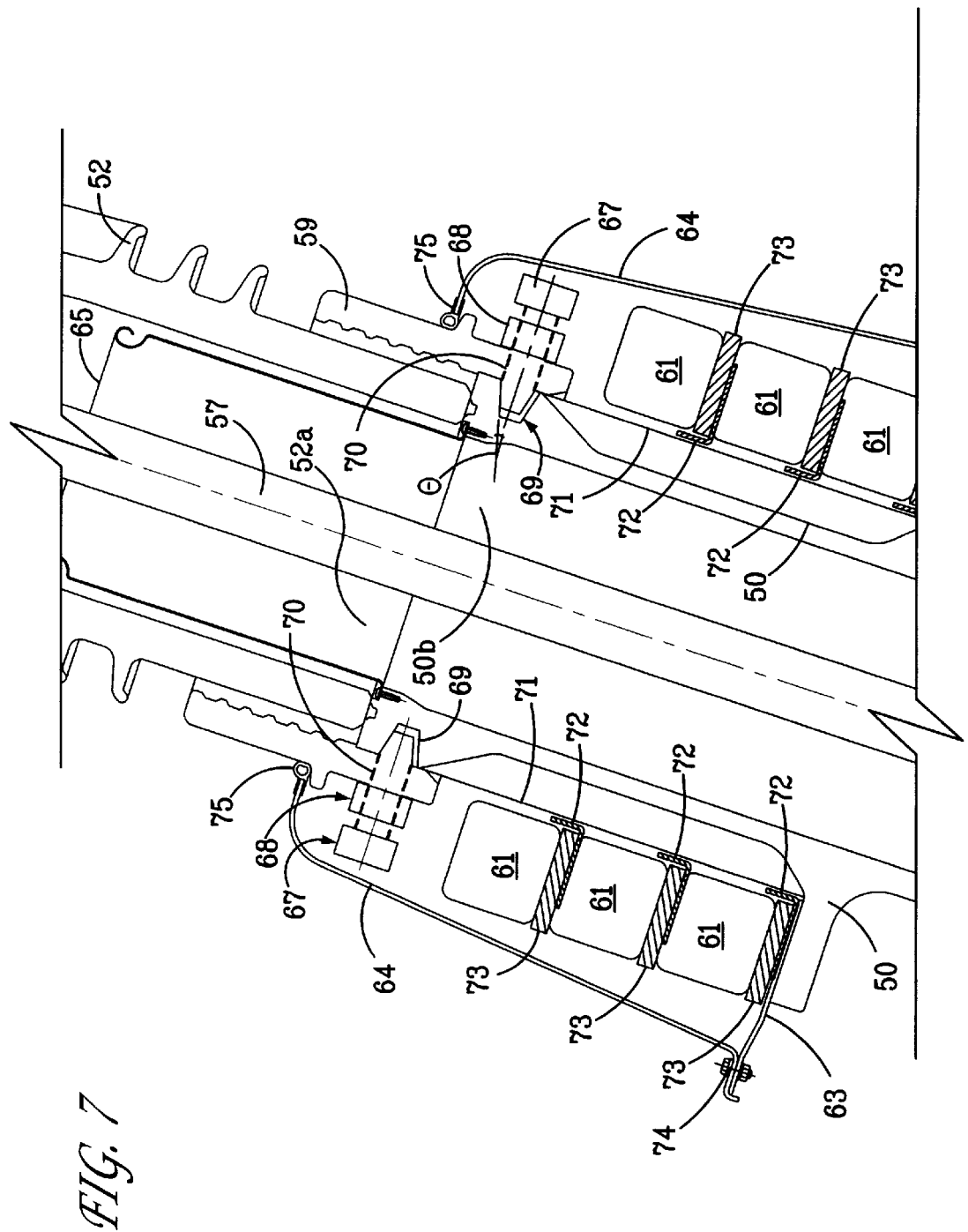
FIG. 7 provides a detailed, cross-sectional view of a further embodiment of the fastening arrangement of the present invention.

Other, more preferred embodiments, use a combination of customized fasteners and minor modifications to the insulating bushing and tank, proximate to the point of joinder, to achieve a strong joint. FIG. 7 provides a detailed, cross-sectional view of such an arrangement. In a preferred embodiment, fasteners are a combination of customized bolts 67, that have conical-shaped heads on the bolt ends, and a locking nut 68. The angle of tapering for the conical-shaped heads should be between about 7° and about 20°, or more preferably an angle of about 10° to about 15°, to join the insulating bushing and tank together. The conical shaped heads of bolts 67 are inserted through the locking nut 68 and then through threaded holes 70 in the lower mounting ring 59 of the insulating bushing 52. The conical head of bolt 67 then engages a machined groove 69 in tank that is within close proximity to the mouth of the aperture of tank 50. Groove 69 is preferably a continuous, V-shaped groove that is machined around the circumference of the mouth of the aperture or nozzle of tank 50. As before, LOCTITE® adhesive (manufactured by Loctite Corporation of Rocky Hill, Conn.) is preferably added to retain fasteners 67 to minimize friction, improve clamping force, and act as a partial weather seal. The joinder method illustrated in FIG.

7 affords disassembly of the joint even if a low cone angle shape for customized bolts 67 is employed.

The present invention also discloses exterior housing, or weather covers, for current transformers 61 that are mounted external to the insulating bushings 51 and 52 with an improved design. The exterior housing of the present invention, which is preferably comprised of a metal such as spun aluminum, completely enclose current transformers 61 and minimize such problems as moisture pooling and environmental exposure of the prior art. As FIG. 5 shows (and detailed views of FIGS. 6 and 7 further illustrate), current transformers 61, which are generally ring-shaped, are assembled over and proximate to the neck of the aperture of tank 50. Current transformers 61 preferably comprise non-crimped, continuous secondary leads that are installed through conduit (not shown in the figures) from the external housing 64 to the main control cabinet of the device where they are connected to shorting type terminal blocks (not shown in the figures). As shown in FIG. 5, current transformers 61 are contained within external housing or weather covers, which are comprised of a back plate 71, base 63, and external cover 64. FIGS. 6 and 7 illustrates the placement of current transformers 61 upon bottom plates 72 and spacers 73. Base 63 preferably rests upon a lip or ledge of tank 50. The top portion of external cover 64 preferably rests upon a lip of lower rings 58 or 59, and is fastened to base 63 through a plurality of fasteners 74. External cover 64 is preferably comprised of a malleable metal, such as an aluminum metal of minimal thickness, that allows one to readily lift up cover 64 to access the current transformers 61 that are contained therein without complete disassembly of the exterior housing. Rubber gasket 75 conforms the top of external cover 64 to the surface on lower rings 58 or 59 thereby forming a water-tight seal.

The electrical switching device of the present invention is generally assembled by placing one of more ring-shaped current transformers over the aperture of the tank. The current transformers are disposed upon a bottom plate that rests upon a base plate (which rests upon a lip or ledge of the tank). If more than one current transformer is employed, the current transformers are separated by an additional bottom plate and spacer.

After the current transformers are installed, one or more insulating bushings are mounted over the apertures of the tank thereby forming a continuous, leak-proof volume. In preferred embodiments, the interior surface of the lower ring of the insulating bushing contacts the exterior surface or mouth of the aperture of the tank. A plurality of fasteners are inserted laterally into the mounting ring of the insulating bushing and mouth of the aperture of the tank. The fasteners may be standard hardware such as retention bolts and a conical shaped washer or a customized bolts with conical-shaped heads. LOCTITE® is added to the fasteners to fully load the joint. If the customized bolt is used, the conical-shaped head of the bolt is inserted into the locking nut, through specially threaded holes in the lower mounting ring of the insulating bushing, and engage a groove, preferable a V-shaped groove, that is machined into the circumference of the neck of the aperture or nozzle of the tank.

After the insulating bushing and tank are joined together, the external cover or weathers covers that protect the current transformers are installed. The external cover, which is preferably insulated and sealed via a rubber gasket at its top portion to a lip or ridge on the lower mounting ring of the insulating bushing, is fastened at the edge of the base plate via a plurality of fasteners. This allows easy accessibility to the current transformers without disassembly of the external housing.

The present invention is directed to parts and apparatuses that include, but are not limited to, electrical switching devices, regardless of any specific description in the drawing or examples set forth herein. It will be understood that the present invention is not limited to use of any of the particular parts or assemblies discussed herein. Indeed, this invention can be used in any switching device that requires the need to join two materials at a high stress junction. Further, the apparatus disclosed in the present invention can be used with the joinder method of the present invention or a variety of other applications.

While the present invention has been particularly shown and described with reference to the presently preferred embodiments thereof, it will be understood by those skilled in the art that the invention is not limited to the embodiments specifically disclosed herein. Those skilled in the art will appreciate that various changes and adaptations of the present invention may be made in the form and details of these embodiments without departing from the true spirit and scope of the invention as defined by the following claims.

We claim:

1. An electrical switching device, said device comprising:
    a tank that has an interior volume and at least one opening;
    at least one insulating bushing that has an interior volume, a central axis, and an open-ended base that is mounted over the opening of the tank thereby creating a continuous volume; and
    a plurality of fasteners that join the tank to each said at least one insulating bushing, wherein the fasteners are inserted at an angle substantially perpendicular to the central axis of the insulating bushing.

2. The device of claim 1 wherein the fasteners comprise a plurality of retention bolts.

3. The device of claim 2 further comprising a plurality of conical-shaped washers.

4. The device of claim 1 wherein the fasteners comprise a plurality of conical-shaped headed bolts.

5. The device of claim 4 wherein the tank comprises a circumferential external surface and the fasteners are inserted through threaded openings within the insulating bushing and engage a groove that is machined into the circumference of the external surface of the tank within close proximity to the opening.

6. The device of claim 1 wherein the number of fasteners ranges between 4 and 32.

7. The device of claim 1 wherein the number of fasteners ranges between 8 and 18.

8. An electrical switching device comprising:
    a conductive switching portion for carrying current between one or more conductors;
    a tank that has at least one aperture and an interior volume that houses the conductive switching portion;
    at least one insulating bushing that comprises an interior volume that houses a conductor and a mounting ring wherein the aperture of the tank is inserted into the interior volume of the insulating bushing thereby creating a continuous volume between the insulating bushing and the tank; and
    a plurality of fasteners that join each said at least one insulating bushing to the tank wherein the fasteners are inserted into the mounting ring laterally such that the conductive switching portion is connected to the conductors.

9. The device of claim 8 wherein each insulating bushing comprises a central axis and the fasteners are inserted into the mounting ring at an angle substantially perpendicular to the axis of the insulating bushing.

10. The device of claim 8 wherein the fasteners comprise retention bolts and conical-shaped washer combinations.

11. The device of claim 8 wherein the fasteners comprise a plurality of conical-shaped headed bolts.

12. The device of claim 11 wherein the tank comprises a circumferential external surface and an open-ended base and said insulating bushing has a plurality of threaded openings and said tank has a groove that is machined into the circumference of the external surface of the tank in close proximity to the open-ended base thereof, the fasteners being inserted through said threaded openings and into engagement with the groove of the tank.

13. The device of claim 8 wherein the number of fasteners ranges between 4 and 32.

14. The device of claim 8 wherein the number of fasteners ranges between 8 and 18.

* * * * *